(12) United States Patent  
Piqueras Jover

(10) Patent No.: US 10,257,874 B2  
(45) Date of Patent: *Apr. 9, 2019

(54) SYNCHRONIZING MOBILE DEVICES AND DISPLAYS

(71) Applicant: AT&T Intellectual Property I, L.P., Atlanta, GA (US)

(72) Inventor: Roger Piqueras Jover, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,208

(22) Filed: Mar. 20, 2017

(65) Prior Publication Data

US 2017/0196037 A1 Jul. 6, 2017

Related U.S. Application Data

(63) Continuation of application No. 15/200,829, filed on Jul. 1, 2016, now Pat. No. 9,603,173, which is a (Continued)

(51) Int. Cl.
*H04W 76/14* (2018.01)
*H04W 76/10* (2018.01)
(Continued)

(52) U.S. Cl.
CPC ...... *H04W 76/14* (2018.02); *G06F 17/30861* (2013.01); *G06F 17/30879* (2013.01); *G06F 21/305* (2013.01); *G06K 7/1404* (2013.01); *G06K 19/06037* (2013.01); *G06K 19/06112* (2013.01); *H04B 1/3827* (2013.01); *H04L 65/1016* (2013.01); *H04L 65/1069* (2013.01); *H04L 67/146* (2013.01); *H04M 1/7253* (2013.01); *H04N 21/4122* (2013.01); *H04N 21/4126* (2013.01); *H04N 21/41407* (2013.01); *H04N 21/42684* (2013.01); *H04N 21/4367* (2013.01); *H04N 21/6125* (2013.01); (Continued)

(58) Field of Classification Search
None
See application file for complete search history.

(56) References Cited

U.S. PATENT DOCUMENTS 5,793,903 A * 8/1998 Lopresti ............... G06K 9/00
382/306
7,797,430 B2 * 9/2010 Ichieda ................. H04L 67/36
709/204

(Continued)

*Primary Examiner* — Christle I Marshall

(57) ABSTRACT

Methods and tangible computer-readable media for synchronizing a mobile device to a display via a communication network are disclosed. For example, a method receives an identification code from a display and sends a request to the communication network to establish a communication session between a mobile device and the display. The request comprises the identification code. Thereafter, the communication session is established via the communication network. Another method receives a request to establish a communication session between the mobile device and the display. The request comprises an identification code of the display that was received by the mobile device from the display. The method then establishes the communication session.

20 Claims, 5 Drawing Sheets

US 10,257,874 B2
Page 2

Related U.S. Application Data continuation of application No. 14/868,030, filed on Sep. 28, 2015, now Pat. No. 9,386,611, which is a continuation of application No. 14/562,484, filed on Dec. 5, 2014, now Pat. No. 9,148,897, which is a continuation of application No. 13/652,384, filed on Oct. 15, 2012, now Pat. No. 8,915,441.

(51) Int. Cl.

| | | |
|---|---|---|
| *H04N 21/41* | (2011.01) | |
| *H04N 21/414* | (2011.01) | |
| *H04N 21/426* | (2011.01) | |
| *H04N 21/4367* | (2011.01) | |
| *H04N 21/61* | (2011.01) | |
| *H04W 12/08* | (2009.01) | |
| *G06K 7/14* | (2006.01) | |
| *H04L 29/06* | (2006.01) | |
| *G06F 17/30* | (2006.01) | |
| *G06F 21/30* | (2013.01) | |
| *G06K 19/06* | (2006.01) | |
| *H04W 72/02* | (2009.01) | |
| *H04B 1/3827* | (2015.01) | |
| *H04L 29/08* | (2006.01) | |
| *H04W 12/06* | (2009.01) | |
| *H04M 1/725* | (2006.01) | |
| *H04W 4/70* | (2018.01) | |
| *H04W 4/80* | (2018.01) | |

(52) U.S. Cl.
CPC ..... *H04N 21/6131* (2013.01); *H04N 21/6175* (2013.01); *H04N 21/6181* (2013.01); *H04W 12/06* (2013.01); *H04W 12/08* (2013.01); *H04W 72/02* (2013.01); *H04W 76/10* (2018.02); *H04M 2250/52* (2013.01); *H04W 4/70* (2018.02); *H04W 4/80* (2018.02)

(56) References Cited

U.S. PATENT DOCUMENTS

| | | | |
|---|---|---|---|
| 8,403,215 B2 | 3/2013 | Aihara et al. | |
| 8,443,407 B2 | 5/2013 | Gaede et al. | |
| 8,553,146 B2 * | 10/2013 | Kennedy | G06T 1/0085 |
| | | | 235/462.05 |
| 8,610,730 B1 | 12/2013 | Li | |
| 8,915,441 B2 | 12/2014 | Piqueras Jover | |
| 9,148,897 B2 | 9/2015 | Piqueras Jover | |
| 9,386,611 B2 | 7/2016 | Piqueras Jover | |
| 9,589,415 B2 * | 3/2017 | Montenegro | G07F 17/3211 |
| 9,603,173 B2 * | 3/2017 | Piqueras Jover | H04W 76/02 |
| 2006/0011728 A1 | 1/2006 | Frantz et al. | |
| 2010/0220250 A1 | 9/2010 | Vanderwall et al. | |

* cited by examiner

SYNCHRONIZING MOBILE DEVICES AND DISPLAYS

This application is a continuation of U.S. patent application Ser. No. 15/200,829, filed Jul. 1, 2016, now U.S. Pat. No. 9,603,173, which is a continuation of U.S. patent application Ser. No. 14/868,030, filed Sep. 28, 2015, now U.S. Pat. No. 9,386,611, which is a continuation of U.S. patent application Ser. No. 14/562,484, filed Dec. 5, 2014, now U.S. Pat. No. 9,148,897, which is a continuation of U.S. patent application Ser. No. 13/652,384, filed Oct. 15, 2012, now U.S. Pat. No. 8,915,441, all of which are herein incorporated by reference in their entirety.

The present disclosure relates generally to the synchronization between a mobile device and a display.

BACKGROUND

Current trends in wireless technology are leading towards a future where virtually any object can be network enabled and Internet Protocol (IP) addressable. The pervasive presence of wireless network, including cellular, Wi-Fi, ZigBee, satellite and Bluetooth network, and the migration to a 128-bit IPv6-based address space provides the tools and resources for the paradigm of the Internet of Things (IoT) to become a reality.

SUMMARY

In one embodiment, the present disclosure describes a method for synchronizing a mobile device to a display via a communication network. For example, the method obtains an identification code from a display and sends a request to the communication network to establish a communication session between a mobile device and the display. The request comprises the identification code. Thereafter, the method then interacts with the display over the communication session once the communication session is established via the communication network.

In a further embodiment, the present disclosure describes another method for synchronizing a mobile device to a display via a communication network. For example, the method receives a request to establish a communication session between the mobile device and the display, wherein the request comprises an identification code of a display, wherein the identification code was received by the mobile device from the display, and establishes the communication session.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
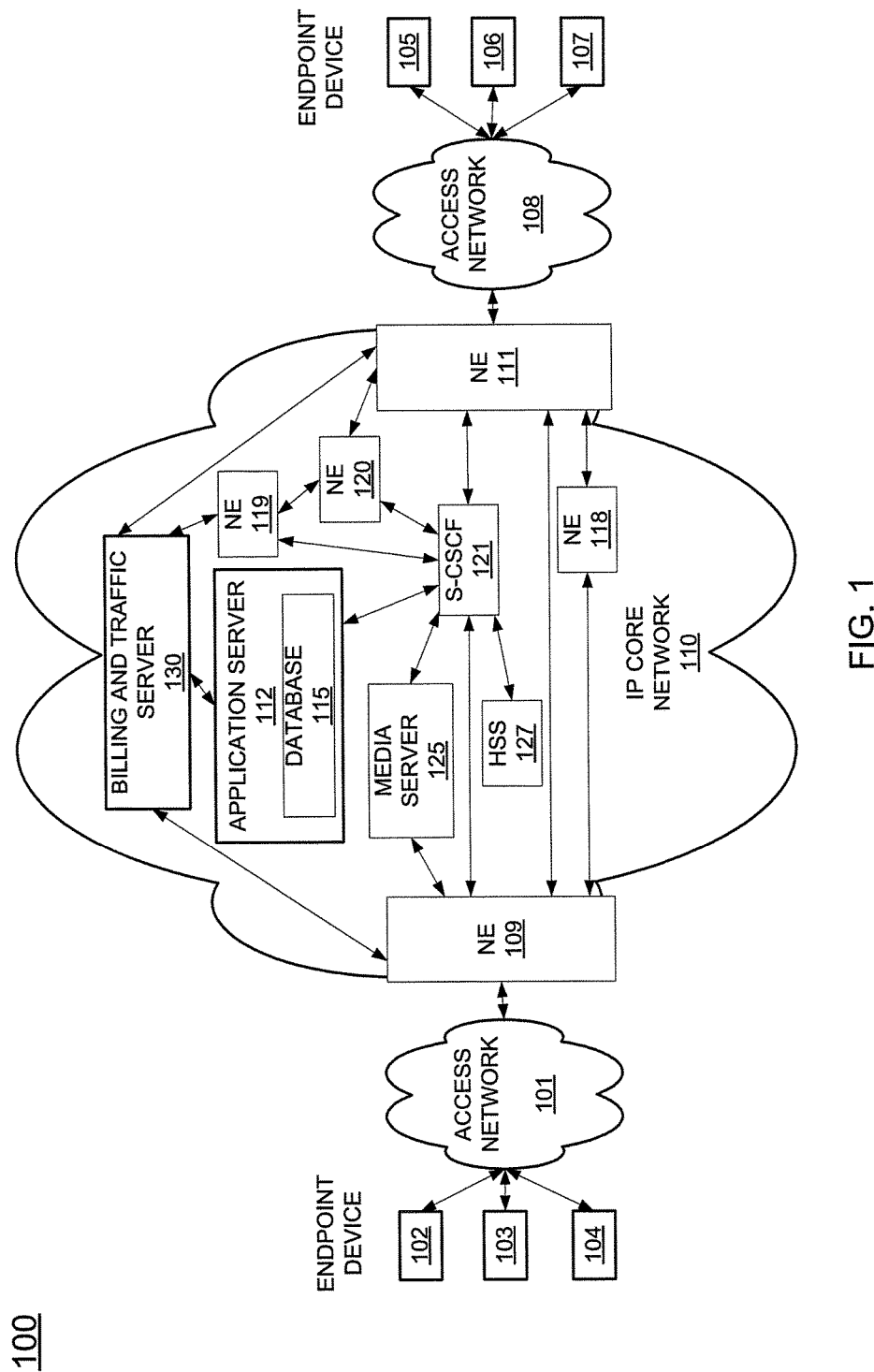
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

Any one or more of the endpoint devices 102-107 may comprise customer endpoint devices such as personal computers, laptop computers, Personal Digital Assistants (PDAs), mobile/cellular phones, smart phones, PBXs, aggregate endpoints (e.g., an aggregate endpoint that employs a Session Initiation Protocol (SIP) user agent to interact with the network on behalf of a plurality of endpoints aggregated behind it) and the like. One or more of the endpoint devices 102-107 may also comprise a television, monitor, touch screen, or similar display. For example, endpoint device 102 may comprise a smart television, or smart TV. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a cellular or wireless access network, a 3$^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services, cellular services and the like). In one particular embodiment, the S-CSCF 121 supports the establishment of a communication session for synchronizing a mobile device to a display in accordance with the present disclosure. The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers, in the case of a VoIP/voice call, other devices in the case of calls/messages terminating and/or originating in cellular access networks). For example, the S-CSCF may need to interact with another server for translation of an E.164 voice network address into an SIP URI, and so on. For example, the S-CSCF routes to a P-CSCF indicated by the SIP URI. The P-CSCF then routes to the SIP User Agent (UA) over a relationship that is established between the P-CSCF and the SIP UA which may represent an aggregate endpoint. This relationship could be a SIP trunk.

The Media Server (MS) 125 is a special server that typically handles and terminates media streams to provide services such as announcements, bridges, and Interactive Voice Response (IVR) messages for VoIP and cellular service applications. The media server also interacts with customers for media session management to accomplish tasks such as process requests.

The billing and traffic server 130 (broadly a billing server) is a dedicated server that tracks communication traffic for the purpose of generating bills to the customers of the service provider. For example, the billing and traffic server 130 is capable of tracking a large number of call parameters, or features, such as and not limited to: the number of calls, the duration of calls, the calling party numbers, the called party numbers, the types of call, and so on. In the context of the present disclosure a "call", a "session" or a "communication session" is broadly considered to be any voice or data call (e.g., including short message service (SMS) messages) traversing the network, and includes calls originating and/or terminating in cellular access networks, Wi-Fi networks and other access network. These call features are processed and accounted by the billing and traffic server 130 so that proper bills are generated and provided to the customers of the service provider.

In one embodiment, the network elements that are involved in supporting a call will provide call handling information to the billing and traffic server 130. For example, the border elements (e.g., 109, and 111) that support a media path between a calling party (e.g., endpoint device 102) and a called party (e.g., endpoint device 105) will provide one or more call detail records (CDRs) to the billing and traffic server 130 upon termination of the call.

The application server (AS) 112 may comprise any server or computer that is well known in the art, and the database 115 may be any type of electronic collection of data that is also well known in the art. In one embodiment, application server 112 enables and supports interworking or synchronization between a mobile device and a display in a communication session. For example, S-CSCF 121 may receive a request from a mobile device (e.g., endpoint device 102) to establish a communication session with another device (e.g., endpoint device 105, which may comprise a display according to the present disclosure). The S-CSCF may query the HSS 127 for authorization, service information, user profile information and the like relating a destination address of the endpoint device 105 that is specified in the request to establish the communication session. Accordingly, the service profile information obtained from the HSS may indicate that the destination address is a display that is configured for mobile device synchronization and that the request to establish the communication session requires further processing by application server 112. In turn, S-CSCF 121 may query application server 112 for instructions on further processing of the communication request.

Among other things, application server 112 may provide synchronization services, or perform a method for synchronization, in accordance with the present disclosure. Database 115 may store information in support of such a service/method, e.g., including a list of displays that are configured for mobile device synchronization and one or more parameters pertaining thereto. For example, a database entry in database 115 may include a display/device identifier, a status identifier of the display, information on the technical capabilities and features available on the display, a white list/blacklist of acceptable and unacceptable devices for synchronizing with the display, policy rules regarding synchronization to the display, such as time limits for synchronization communication sessions, limits on the quantity of data and communications that may be passed to the display, and similar information. It should be noted that the foregoing are only several examples of the types of information and data that may be used in conjunction with the devices, networks and methods described herein for synchronizing a mobile device to a display. As such, the present disclosure is not limited to only the above examples.

In one embodiment, upon receiving a query, e.g., from S-CSCF 121, the application server 112 may identify a particular display and extract relevant data relating to the display from database 115. The application server 112 may further send instructions to the S-CSCF and/or any one or more further network devices in connection with establishing the communication session between the mobile device and the display. For example, the application server 112 may instruct S-CSCF 121 to set up a media path for the communication session that traverses a particular network element, e.g., NE 118, for providing a media format translation for interworking between the display and the mobile device. Alternatively, or in addition, the application server 112 may make a determination as to whether or not a particular mobile device should be allowed to have the communication session set up on its behalf. For example, if the mobile device is not on a list of authorized devices (e.g., in database 115), the application server 112 may instruct S-CSCF to drop the communication session setup. Further details regarding the functions that may be implemented by application server 112 are discussed in greater detail below in connection with the exemplary methods 300 and 400.

In addition, those skilled in the art will realize that the network 100 may be expanded by including additional endpoint devices, access networks, network elements, application servers, etc. without altering the scope of the present disclosure. Further, the above IP network is only described to provide an illustrative environment in which packets for voice, data, and multimedia services are transmitted on IP Multimedia Subsystem (IMS) networks. In other words, the present disclosure is not limited to an IMS network and may instead be incorporated or used in various other types of networks, such as a satellite based network, a cellular network, such as a General Packet Radio Service (GPRS) network, a Universal Mobile Telecommunication System (UMTS) Terrestrial Radio Access Network (UTRAN), a Long Term Evolution (LTE) network, and the like.

Figure 2:
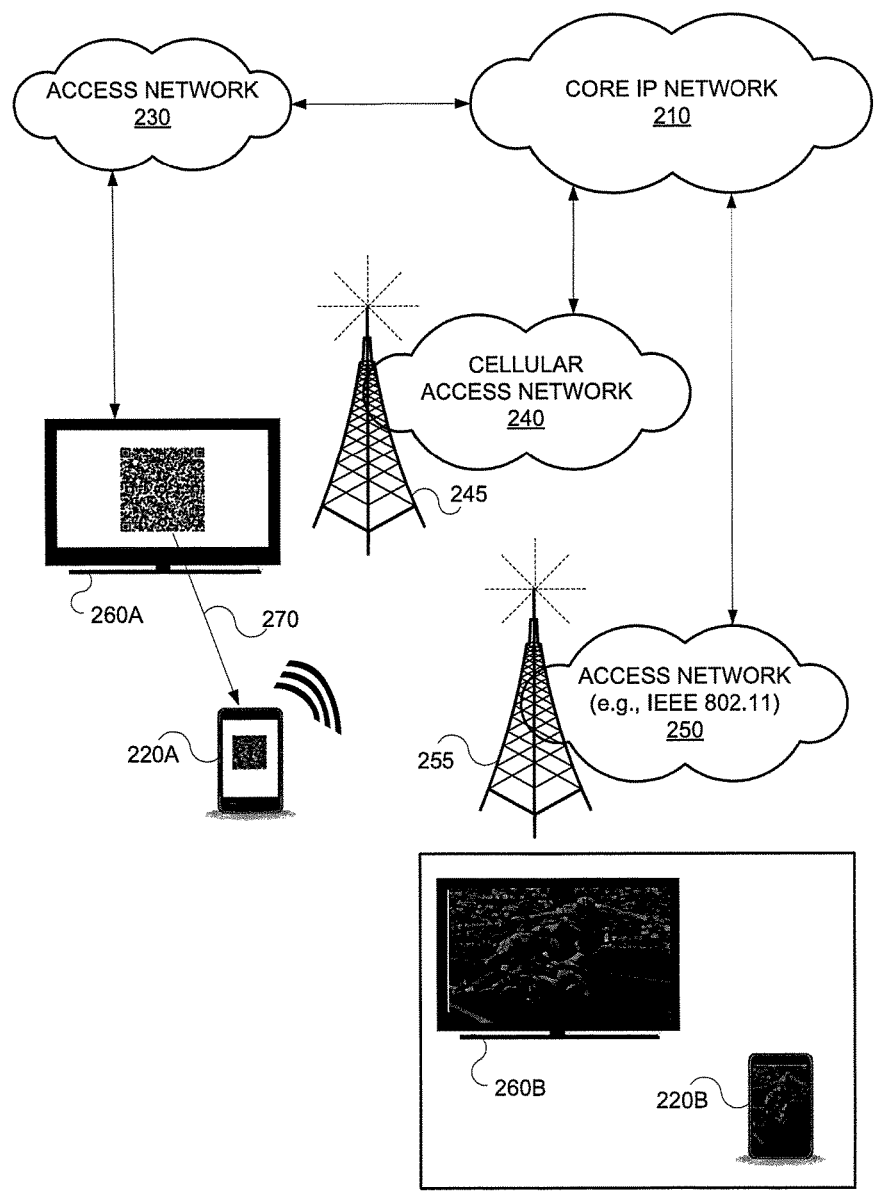
FIG. 2 illustrates an exemplary system for synchronizing a mobile device to a display, according to the present disclosure.

FIG. 2 illustrates an exemplary system 200 for synchronizing a mobile device to a display according to the present disclosure. It should be noted that one or more components of the system 200 may comprise the same or similar components and devices that appear in the network 100 of FIG. 1. For example, FIG. 2 illustrates a core IP network 210 which may comprise the same or a similar network to the IP core network 110 as shown in FIG. 1. Similarly, FIG. 2 illustrates an access network 230, a cellular access network 240 and an access network 250, which may each correspond to one of the access networks 101 and 108 as shown in FIG. 1.

FIG. 2 illustrates a display 260A which may be configured for synchronization with mobile devices according to embodiments of the present disclosure. As shown in FIG. 2, a mobile endpoint device 220A is attempting to synchronize with the display 260A. In one embodiment, the display 260A may continuously and/or periodically present an identification code, or a display identifier, via an image or graphic on a screen of the display. For example, the display 260A may present an identification code that is encoded or embedded within one or more pixels, images, videos or other forms of media that are presented on the display. In one embodiment, the identification code uniquely identifies the display 260A for enabling the establishment of a connection to the display. In one embodiment, the identification code may comprise an image, such as a quick response code (QR code), a bar code, or the like. In one embodiment, the image is superimposed over another video or image that is presented on the display 260A. In one embodiment, the identification code is superimposed/displayed as an image or pattern that appears and is refreshed at a rate that is undetectable by the human eye.

For example, for the human eye to perceive a sense of motion (i.e. not distinguish between two frames of a video), content has to be displayed at 16 frames per second or greater. However, at this rate movement may still appear blurry. Therefore, a minimum rate of 24 frames per second is often used in the movie industry. The human eye has a temporal resolution of about ½5th of a second. In other words, if an image is shown on a blank screen and the image disappears, the image is still "seen" for the next ½5th of a second. If the same image appears less than ½5th of a second later (and such a pattern is repeated), the eye perceives a static image. Similarly, image persistence time in the retina of ½5th second produces a sense of a constant flow of motion when displaying a video at 24 frames per second.

In one embodiment, to avoid detection of the identification code by the human eye, the image or pattern is divided into a plurality of different segments or regions, where only one of the plurality of regions is displayed in any given frame. In one embodiment, each region comprises any one or more pixels of the original image. For example, if the image is divided into N regions, region 1 will be displayed in a first frame, region 2 will be displayed in a second frame . . . region N will be displayed in the Nth frame, etc. Notably, a full iteration, where all portions of the image will have been displayed, occurs after N frames. In other words, all portions of the image will be displayed in N*[1/R] seconds, where R is the frame rate in frames per second. It should also be noted that after one of the regions of the image is displayed, the same region of the image will not be displayed again until at least N frames later. As an example, if an image is divided into 12 regions and the display operates at 24 frames per second, the same pixel of the image will only appears every 12*[1/24] seconds, or approximately every 0.5 seconds. Notably, the human eye may not be able to detect a superimposed image that is presented in this manner. In one embodiment, a gap is applied between the displaying of different regions of the image. For example, in one embodiment a delay or gap of at least ½5th second is imposed between the display of one region of the image and the display of a next region of the image. In some instances, the brain may interpolate the subsequently displayed regions (e.g., one or more pixels) if the regions are nearby or sufficiently close together. For example, if the regions shown in each iteration are adjacent, such as if a QR code were drawn with a pencil without leaving the page, showing each iteration too close in time would result in seeing a black point moving around the screen "drawing" the QR code. Thus, introducing a delay between displaying the different regions, or pixels, of the image, may better insure against such "interpolation."

However, typical optical sensors, such as cameras, that are included in many handheld and wireless devices (e.g., cellular telephones, smartphones, and the like) are able to distinguish images and patterns that are presented at such rates. For example, common smartphone cameras that are presently available can capture video at 24-30 frames per second. In one embodiment, an optical sensor detects a displayed image by capturing a single picture with an exposure time greater than the time it takes to display each portion of the image (e.g., greater than N*1/R). In another embodiment, an optical sensor detects a displayed image by capturing video of a duration greater than the time it takes to display each portion of the image (e.g., greater than N*1/R). Each portion or region of the image will be captured in at least one of the frames of video captured by the optical sensor. In one embodiment, the display continuously and/or periodically displays a superimposed image, since it may be unknown when a particular mobile device will attempt to obtain the identification code/image from the display. In one embodiment, the superimposed image is displayed on different parts of the display, from one iteration to the next. For example, the image may be displayed first near a lower left corner of the display after which the image may then be displayed in the upper right corner of the display. This may further prevent a viewer from detecting or being aware that a superimposed image is being displayed.

In one embodiment, the mobile device 220A obtains the identification code from the display 260A via an optical sensor, e.g., an image capturing sensor such as a camera, of the mobile device. However, in another embodiment, the display 260A may present the identification code via a radio frequency signal (e.g., a Bluetooth signal), an infrared signal, or the like which may be obtained by the mobile device when it is within the vicinity of the display via an infrared sensor, a Bluetooth antenna, or the like. The mobile device 220A may additionally store the identification code of the display 260A for later use. For example, after obtaining the identification code of the display 260A in any one or more of the manners describes above, the mobile device 220A may store the identification code of the display in a memory, e.g., on the mobile or handheld device.

After the mobile device 220A has obtained the image (e.g., the identification code or display identifier of the display) the mobile device may send a request via the core IP network 210 to synchronize, that is, to establish a communication session, with the display over the network 210. In one embodiment, the mobile device 220A sends the request via a base station, base transceiver station (BTS), Node B, or evolved Node B (eNodeB) (e.g., element 245 illustrated in FIG. 2), and cellular access network 240. In another embodiment, the mobile device may send the request via a wireless access point, e.g., an IEEE 802.11 access point or Wi-Fi access point and a wireless access network (e.g., access network 250 in FIG. 2). Thus, the request may be forwarded to one or more components of core IP network 210 for establishing the communication session between the mobile endpoint device 220A and the display 260A.

The core IP network 210 may perform any number of processes in connection with establishing the communication session, such as performing authentication and authorization checks against the mobile device 220A, obtaining status information of the display 260A, and the like. For example, the core IP network 210 may query the display for a current status via access network 230 prior to establishing a media path for the communication session. If the conditions are such that the core IP network determines that it is proper to establish the requested session, the core IP network will complete the session setup towards the display 260A via the access network 230. In other words, a media path may be established between display 260A and mobile device 220A via the access network 230, core IP network 210 and one of the access networks 240 and 250. Once the communication session is thus established, the display 260A and the mobile device 220A may be considered synchronized.

It should be noted that the present disclosure describes embodiments where a communication session for synchronization is established over a core IP network. For example, the communication session may comprise a secure connection implemented over a communication network. However, in some embodiments synchronization between a mobile device and a display may be achieved over a local area network, a Wi-Fi network or the like. For example, an image/display identifier may contain instructions for a mobile device to connect to the display over a locally available Wi-Fi network. Thus, in such an embodiment the communication session may not traverse over a core IP network.

The synchronization may be for any number of purposes depending upon the capabilities, design and access, security and privacy settings of both the display 260A and the mobile device 220A. For example, in one embodiment, the display may be presenting an image or a video of a sporting event and the purpose of synchronizing to the display is to allow the mobile device to present the same video content simultaneous with the display (or vice versa where the image or video displayed on the mobile device is displayed on the display). The image or video may comprise any content (with or without corresponding audio signals), e.g., an electronic text document, a presentation of slides, still pictures, videos and the like.

For instance, display 260B and mobile device 220B correspond to display 260A and mobile device 220A at a later time when the two devices are synchronized. Notably, both devices are simultaneously showing the same video that appears on the display. Various other applications and uses for synchronization between a mobile device and a display are discussed below in connection with the exemplary methods 300 and 400.

Figure 3:
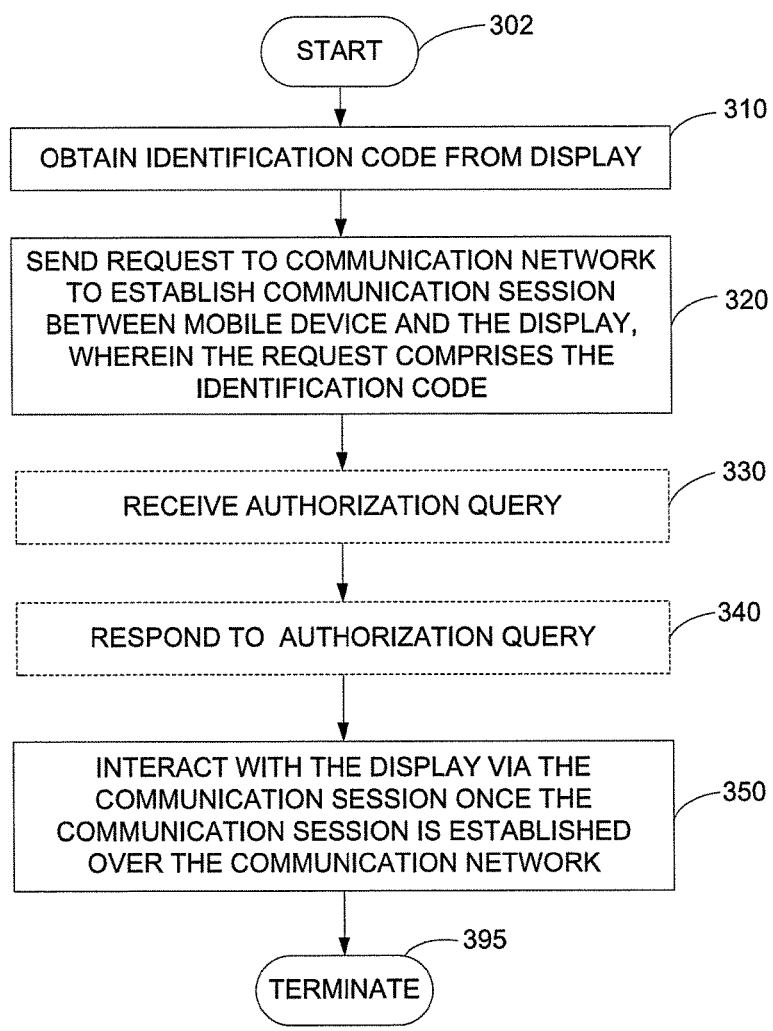
FIG. 3 illustrates a flowchart of a method for synchronizing a mobile device to a display, according to the present disclosure.

FIG. 3 illustrates a flowchart of a method 300 for synchronizing a mobile device to a display. In one embodiment, the method 300 may be performed by a mobile device, or any one or more components thereof (e.g., a processor performing operations stored in and loaded from a tangible computer readable medium e.g., a memory and the like). Method 300 starts in step 302 and proceeds to step 310.

In step 310, the method obtains an identification code from a display. For example, in one embodiment a display may present an identification code of the display that is encoded or embedded within one or more pixels, images, videos or other forms of media that are presented on the display. In one embodiment, the identification code uniquely identifies the display for enabling the establishment of a connection to the display. In one embodiment, the identification code is encoded in a graphic or image that is presented on the display. For example, the identification code may comprise an image in the form of a QR code, a bar code, or the like.

In one embodiment, the image is superimposed over another video or image that is presented on the display. In one embodiment, the identification code is superimposed/displayed as an image or pattern that appears and is refreshed at a frame rate that is generally undetectable by the human eye. For example, the human eye may not be able to detect pixels that appear and disappear at certain refresh rate, e.g., a rate of 24 frames per second or greater given certain conditions. In one embodiment, one or more regions of the image or pattern may appear in any given frame, with each region making up the entire image being displayed within one of the 24 frames. For example, all of the dots or pixels making up the image may be divided into segments. Each of the segments is then displayed in a different frame in a random fashion, e.g., at a frequency at or above 24 frames per second. It should be noted that a higher refresh rate can be used.

In one embodiment, at step 310 the method obtains the identification code from the display via an optical sensor, such as a camera, of a mobile or handheld device. However, in another embodiment, the display may present the identification code via a RF signal such as Bluetooth signal, an infrared signal, or the like which may be obtained or detected by the method at step 310. For example, the method 300 may detect the identification code via an infrared sensor of a mobile device when it is within the vicinity of the display. At step 310 the method may additionally store the identification code of the display for later use. For example, after obtaining the identification code of the display in any one or more of the manners describes above, the method 300 may store the identification code of the display in a memory, e.g., on the mobile or handheld device.

At step 320, the method 300 sends a request to a communication network, e.g., an application server, to establish a communication session between the mobile device and the display. For example, the mobile device may be a cellular endpoint device that is capable of communicating with one or more devices in a core communication network (e.g., core IP network 110 in FIG. 1) via a cellular access network. In another embodiment, the mobile device may alternatively or additionally be capable of communicating with the one or more devices in the core communication network via a wireless access link (e.g., a Wi-Fi connection) and/or a wireless access network. Accordingly, the request may be received by the one or more devices in the core communication network for processing a request in connection with establishing the communication session between the mobile device and the display. For example, in one embodiment, the request is received by a S-CSCF which determines that the request is for synchronizing/establishing a communication session with the display. For instance, the identification code may include an IP address of the display and may further include other information to indicate that the request is for establishing a synchronization session between the requesting mobile device and the display.

In one embodiment, the S-CSCF may query a HSS, a media server or an application server for relevant service information pertaining to the display. For example, the S-CSCF may query a HSS using the IP address of the display. The HSS may respond to the S-CSCF indicating that the display requires special processing in connection with the synchronization request. As such, the S-CSCF may query the application server for further relevant information. For instance, the application server may include a database that stores service data pertaining to the display. For instance, in one embodiment the application server may store a list of authorized devices and/or corresponding users which may connect to the display. In one embodiment, the application server may store information that indicates whether the display is currently in another communication session (and therefore may be unavailable for establishing a communication session in accordance with the new request). In one embodiment, the application server may contain further service logic for the S-CSCF. For instance, the application server may store instructions for the S-CSCF to invoke a media server to interact with the requesting device, e.g., providing various announcements.

In one embodiment, following step 320 the method 300 proceeds to step 330 where the method receives an authorization query (e.g., from an application server and/or for one or more other network devices). For example, a media server may present a challenge/response dialog for obtaining a password from the requesting mobile device, for authenticating the mobile device, to test the device capabilities of the requesting mobile device, etc. In one embodiment, the media server is invoked by an application server or by a S-CSCF in response to the request sent at step 320. In one embodiment, a user of a mobile device may be prompted to enter a password, a conference code, a token, or other identifying information to enable the authorization of the user's mobile device.

In one embodiment, following step 330 the method 300 proceeds to step 340 where the method responds to the authorization query. For example, the method may convey a user input via the mobile device, such as a password entered by a user. In one embodiment, the method 300 retrieves a security token of the mobile device and sends the token (e.g., to a network-based media server) at step 340. The media server or other network device, such as an application server or the S-CSCF, may check the credentials provided at step 340 against a database in the network or may pass the information directly to the display for authorizing the mobile device. For example, if the password correctly matches a password that is set for the display, the S-CSCF may continue to set up the session between the mobile device and the display. On the other hand the request may be denied, e.g., if the mobile device is not authorized, or an incorrect password is provided, etc. It should also be noted that the requested communication session may also be denied for any number of other reasons. For instance, if the display is currently in another communication session and is therefore not available, if the display and the mobile device are not compatible for purposes of the requested communication session, if the mobile device has not paid for the service, etc.

When the communication session is established between the mobile device and the display, the method 300 continues to step 350 where the method interacts with the display via the communication session. For instance, step 350 may comprise a method for controlling what is shown on the display (e.g., via the mobile device). For example, in one embodiment the communication session is for using the mobile device as a remote control for the display. For instance, the display may comprise a television or "smart TV" that is configured to receive instructions via the communication session for determining what is displayed on the television screen.

In one embodiment, the communication session is for identifying an item such as a program that is currently being shown on the display and showing content related to the item on the mobile device. For example, the image/display identifier may enable the establishment of the communication session to allow the mobile device to determine identifying information about what is being shown on the display, e.g., a movie, an advertisement, a television program, a sports program, a news program and the like. For instance, the communication session may be for obtaining the name of a movie, information on the actors appearing in the current scene, the artist and title of a song currently being played in a movie on the display, the names of the teams playing in a sporting event, the current score of the match, etc.

In one embodiment, the method 300 may synchronize what is being shown on the mobile device with what is being shown on the display. For instance, a user of the mobile device may be watching a video which will be simultaneously displayed on the display to which it is connected in the communication session. Notably, a media path of the communication session traverses through the communication network (e.g., core IP network 110). Thus, in one embodiment one or more packets may traverse from the mobile device through the communication network to the display. The packets may comprise the video data that is to be simultaneously displayed on both the mobile device and the display.

It should be noted that the communication session may be limited to synchronizing only a single application, or selected applications on the mobile device with the display. For instance, a security/privacy setting associated with the mobile device or associated with the display may limit synchronization to only videos or images that are set to "public" or "shared" on the mobile device. As such, if a user of the mobile device inadvertently selects a private or non-shared image or video, it will not be simultaneously shown on the display. Similarly, if a user of the mobile device accesses an address book, the address book may be displayed on the mobile device but will be prevented from appearing on the display. As another example, the display may have a number of restrictions or settings that prevent the display of objectionable material. As such, content-based filtering or similar techniques may be applied either at the display or in the network (e.g., at an application server or other network element) which may block all or substantially all objectionable material from appearing on the display. This approach allows the ability to monitor the content that is being presented on the display that is being controlled by the mobile device. For example, a university may want the ability to monitor the content that is being presented on a public display situated in a student lounge that is currently under the control of a mobile device of a student of the university.

In one embodiment, the communication session is for showing on the mobile device contents that are currently being shown on the display. For example, a display in a public park may be showing an audiovisual presentation about the history of the park. Thereafter, a mobile device may synchronize to the display according to the method 300. Accordingly, step 350 may comprise the method receiving (e.g., at the mobile device) the same audiovisual presentation that is being shown on the display. The method may then simultaneously show the audiovisual presentation on the mobile device (e.g., via a screen and/or speakers of the mobile device). As such, a user of the mobile device may continue to watch and listen to the audiovisual presentation but may walk away from the display to a different part of the park, for instance. In another embodiment, the communication session may be for transmitting audiovisual content or images that are being shown on the mobile device to the display, where the same audiovisual content or images are then shown simultaneously on the display.

In still another embodiment, the interaction at step 350 may comprise receiving, via the communication session, audiovisual content or images that are being shown on the display, showing the audiovisual contents or images on a screen of the mobile device, providing annotations to the contents and simultaneously showing the annotations on the display. For example, a display may be presenting a video replay of a sporting event. Accordingly, the same video may be shown on the mobile device where a user may add annotations to the video in any number of ways. For example, the user may add audio commentary (e.g., via a microphone of the mobile device). Alternatively, or in addition, the user may add visual commentary such as arrows or lines indicating movement or direction, circling items of importance and the like. For instance, the user may interact via a touch screen, either with or without a stylus or similar tool. The user commentary may be conveyed back to the display via the communication session where the user commentary is then shown or played simultaneously with the video that is appearing on the display.

Such an embodiment may be useful in any number of applications. For instance, in a classroom setting the teacher and one or more students may each take turns "seizing" the display. For example, the teacher may ask each student to illustrate how he or she believes a particular equation should be plotted on a graph. Each student may take turns having a communication session with the display in order to show the entire class how he or she would illustrate the equation on the graph. For instance, the display may present a blank graph. When a communication session is established, step 350 may comprise the display of the blank axes on a mobile device (e.g., of the student). Thereafter, the student may draw the plot of the equation on the graph by using a stylus, dragging a finger over a touch screen or similar means. At the same time, a screen of the mobile device may show the student's input as it is entered. In addition, the student's input may be conveyed via the communication session to the display such that the display is also simultaneously showing the student's input as it is being entered, in other words in substantially real time (e.g., subject to the normal delay experienced by communication network to deliver the input information as quickly and as close to instantaneously as possible).

In still another embodiment, the display may be available for conference presentations. A first mobile device (e.g., of a presenter) may seize the display by obtaining a communication session by way of the method 300. Thereafter, the presenter may invite other conference participants to synchronize to the same display. The presenter may have greater access rights to control what media is shown on the display, but the conference participants may follow along on the own screens and may even be granted limited rights to add content to the shared media. For instance, the presenter may set a new password or authorization code which the other conference attendees must enter in order to subsequently synchronize to the display. As such, the method 300 may be repeated in the same manner, or in substantially the same manner as described above for each of the mobile devices of each of the conference attendees.

Following step 350 the method 300 proceeds to step 395 where the method ends.

Figure 4:
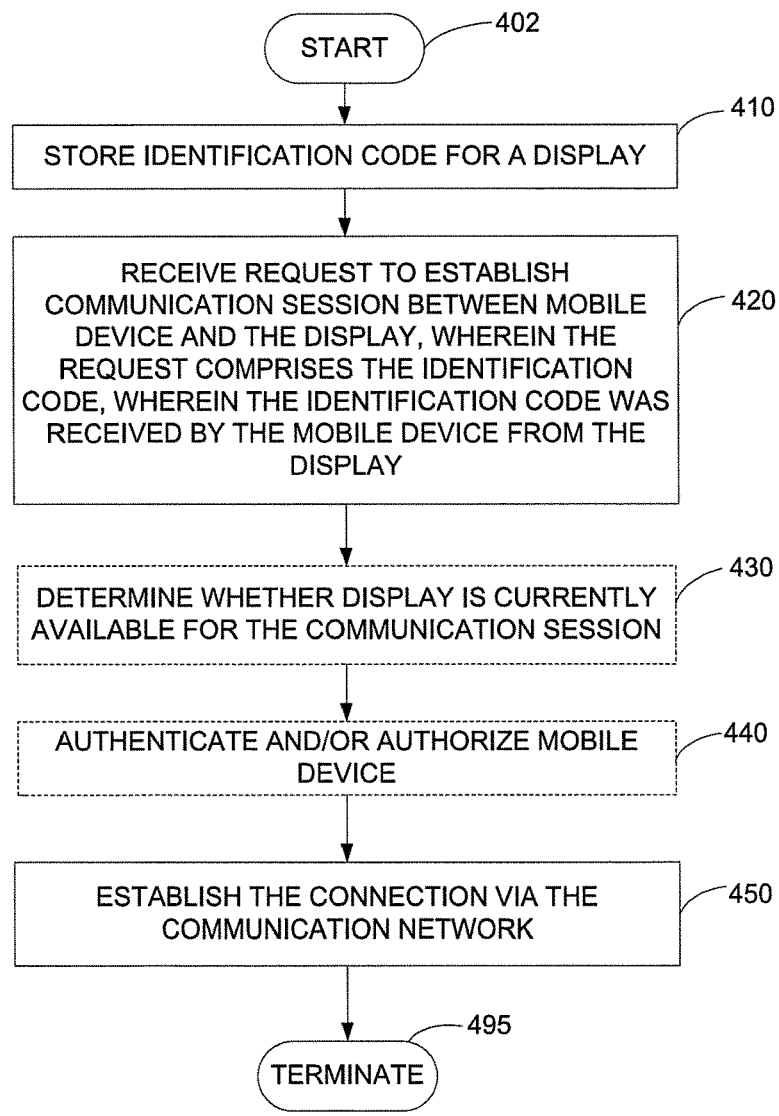
FIG. 4 illustrates a flowchart of another method for synchronizing a mobile device to a display, according to the present disclosure.

FIG. 4 illustrates a flowchart of another method 400 for synchronizing a mobile device to a display. In one embodiment, the method 400 is performed by the application server 112 or any one or more components thereof (e.g., a processor performing operations stored in and loaded from a tangible computer readable medium. e.g., a memory). In another embodiment, the method 400 is performed by any one or more other devices in a communication network, such as communication network 110 of FIG. 1. Method 400 starts in step 402 and proceeds to step 410.

At step 410, the method 400 stores an identification code for a display. For instance, a communication network of a network service provider, such as IP network 110 in FIG. 1, may support communication sessions for synchronizing mobile devices to displays. In one embodiment, one or more identification codes may be used within the communication network for identifying displays, thereby distinguishing displays from one another and for distinguishing displays from other types of devices. For instance, an identification code of a display, or a display identifier may comprise an IP address, a uniform resource location (URL), such as a Session Initiation Protocol (SIP) URL, a uniform resource identifier (URI) and the like. In one embodiment, the identification code may include one or more extensions including such things as a time stamp or a security code. For example, a device identifier may include a base address or base identifier of the display that is combined with the one or more extensions.

In one embodiment, a display may be registered with the communication network as being available for synchronization with mobile devices. For instance, the identification code may be added to a database that stores a number of display identification codes along with various parameters and other information in connection with the associated displays. For example, display identification codes and related information may be stored in database 115 of FIG. 1. In one embodiment, the display identification code is assigned to the display by the communication network. In another embodiment, the identification code is selected by an owner or operator of the display, which may be a different entity than an owner or operator of the communication network. In any case, following step 410, the method is prepared to establish communication sessions with and to synchronize one or more mobile devices to the display.

At step 420, the method 400 receives a request to establish a communication session between a mobile device and the display. In one embodiment, the request may be received from a mobile device and may include the identification code of the display. For example, the mobile device may have obtained the identification code from the display via an optical sensor, such as a camera, integrated within or connected to the mobile device.

At step 430, the method 400 determines whether the display is currently available for synchronization, in other words, whether the display is available to receive the connection. For example, the display may currently be in an established communication session in which the display is synchronized with a different mobile device. As such, depending upon the settings associated with the display, the method may refuse to setup the communication session in accordance with the current request. However, it should be noted that in some embodiments, the display may be configured to have multiple communication sessions and be synchronized to multiple devices simultaneously. Namely, the display can be synchronized with more than one mobile device, e.g., in the context of a classroom with a plurality of students, in the context of a convention hall with a plurality of attendees, and so on. For instance, two devices may each synchronize with one half of a screen of the display. In another embodiment, a new synchronization request may result in the requesting mobile device being included in an ongoing communication session that is already established. In other words, the display may be synchronized to multiple mobile devices in the same session. For instance, each of the mobile devices may be able to add annotations to a video for others to see. For example, one user may add visual annotations to a video that appear in one color (e.g., arrows, circles, etc.) and another user may add visual annotations in another color.

It should be noted that in some embodiments, the method 400 may skip step 430. In other words, step 430 may be considered an optional step. For instance, settings associated with the display may allow for any and all requesting mobile devices to simultaneously synchronize to the display. Accordingly, since no requests will be denied, there is no reason to perform step 430. For example, a display may comprise an information kiosk at a historical site that has a limited purpose of present an audiovisual display for tourist information. As such, a synchronization to the display may simply allow a tourist's mobile device to obtain a simultaneous presentation of the audiovisual information of the display on the mobile device. There may be no opportunity for the mobile device to control what appears on the display in such context.

In another embodiment, the display may be for use at a conference with many participants and audience members. A presentation that will appear on the display may have an interactive component where audience members may have the opportunity to add visual or other inputs that will then appear on the general display for all to see. However, a presenter or moderator may prevent audience members from synchronizing to the display until a certain slide or other points in a presentation are reached. In one embodiment, the display may locally store pertinent information in connection with the display availability. As such, the method 400 at step 430 may query the display to determine whether it is available. In still another embodiment, display availability information may be stored in the network (e.g., in database 115). For instance, database 115 may store information about current settings for a display such as ("in use", "available", "available for sending only", "offline", "restricted", and the like).

In any case, if at step 430 the method 400 determines that the display is not available for synchronization, the method may simply deny the request and will not setup the communication session. If, on the other hand, the display is available for synchronization, the method may proceed to step 440 or step 450.

At step 440, the method 400 authenticates and/or authorizes the mobile device. For example, a display may be in a school setting and is only to be made available for synchronization with teachers' and administrators' mobile devices. Accordingly, the method 400 may consult a list of authorized devices or users (which may be stored, for example, in database 115) prior to allowing the communication session for synchronization between the mobile device and the display. Another display may be configured such that each mobile device may only synchronize with the display for a single communication session per day. For instance, a popular display may be configured such that different users each have a turn to synchronize with the display. Accordingly, a database such as database 115 of FIG. 1, may store a listing of mobile devices or users that have already connected to the display in the current day. As such, the method 400 may consult the list in order to determine whether a new request for synchronization from a mobile device should be allowed. In other words, if the mobile device is on the list, at step 440 the method 400 may deny the request.

In one embodiment, a display may be available for synchronization but only to subscribing or paying users. A database (e.g., database 115) may store a list of mobile devices of users who are authorized to synchronize to the display according to such criteria. Thus, at step 440, the method 400 may consult the database in order to make such a determination. Accordingly, the request from the mobile device to synchronize the display may be either granted or denied based upon such determination. Similarly, in one embodiment a database may store a "blacklist" of banned devices. For example, one or more mobile devices may have previously been flagged for any number of reasons such as violating terms of use, allowing inappropriate material to appear on a display, and the like. As such, if a mobile device is in the blacklist, a request from the mobile device may be denied. It should be noted that step 440 may also be considered an optional step as in some cases a display may be configured to be freely and publicly available.

At step 450, the method 400 establishes a communication session between the mobile device and the display. For instance, the method 400 may have received a request at step 420 that includes an identification code of a display and additional information pertaining to the display. The request may also include an identifier, such as an IP address, a telephone number, a SIP URL or the like, of the requesting mobile device. In one embodiment, the identification code may be received at one or more network elements in a communication network for processing a call/communication session setup. For example, the request may be received by a S-CSCF in a core communication network which, in turn, consults one or more other network devices for setting up the session for synchronization between the mobile device and the display. For instance, the S-CSCF upon receiving the request may query a HSS, an application server, etc. to determine whether any special processing is required for the destination indicated by the identification code (i.e., for the display).

For example, in one embodiment the method 400 (which may be performed by application server 112) may indicate to the S-CSCF that the destination is a display and that the request comprises a request to synchronize the mobile device to the display. In addition, the method 400 may indicate certain additional processing should be performed by the S-CSCF and/or other network devices, and checks whether any in-network features should be enabled. For instance, the method 400 may cause authentication and authorization checks to be performed against the mobile device. In addition, the method 400 may determine whether any other network devices should be included in the media path as the session is established. For example, a media gateway/border element for performing encoding/decoding and/or codec translation may be required in the media path. For instance, the display formatting of the mobile device and the display formatting of the display may be different. A media gateway can perform the necessary translation for interworking between the two devices. As such, the method 400 may cause the communication session to be set up between the display and the mobile device such that synchronization may be enabled. For instance, the S-CSCF may operate under the instructions of the method 400 for establishing the session with the necessary parameters and including the necessary devices in the media path.

For instance, in one embodiment, the method may setup a secure media path between the mobile device and the display via the network. In one embodiment, the method may determine whether the device capabilities of the mobile device and the display are compatible. For example, if the video encoding formats that are used by the mobile device and the display are not the same, the method may setup a media path that include an intermediate device that has translation capabilities, such as a media gateway that can perform video encoding/decoding and translation. Accordingly, the method 400 may provide for interworking between different display formatting of the mobile device and the display. For example, the mobile device may use a MPEG-2 encoding or compression technique while the display may be configured to receive a H.261 digital video steam. Numerous other formats/codecs may be interworked in accordance with the present disclosure including MPEG-1, MPEG-4, H.263, H.264, etc.

When the communication session is established, synchronization between the mobile device and the display provides for or supports any number of useful applications and services such as described above, e.g., providing annotations to a video, obtaining information on media that appears on the display, etc. Method 400 then ends in step 495.

It should be noted that the present synchronization between the mobile device and the display is not a point-to-point synchronization method. In other words, the communication session must be established over a network to allow for content monitoring. Since the displays are often deployed in public settings, authentication of the mobile device must be performed at the network to ensure that the user of the mobile device is authorized to synchronize with the displays.

It should be noted that the steps of the methods 300 and 400 may be performed by any one or more of the components of the network 100 or system 200 depicted in FIGS. 1 and 2 respectively. For example, one or more steps of the method 300 may be implemented by endpoint device 102 or mobile device 220. In another embodiment, one or more steps of the method 400 may be performed by the application server 112, for example. Alternatively, or in addition, one or more steps of the methods 300 or 400 may be implemented by a general purpose computer having a processor, a memory and input/output devices as illustrated below in FIG. 5.

In addition, although not expressly specified above, one or more steps of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, operations, steps or blocks in FIGS. 3 and 4 that recite a determining operation or involve a decision do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

Figure 5:
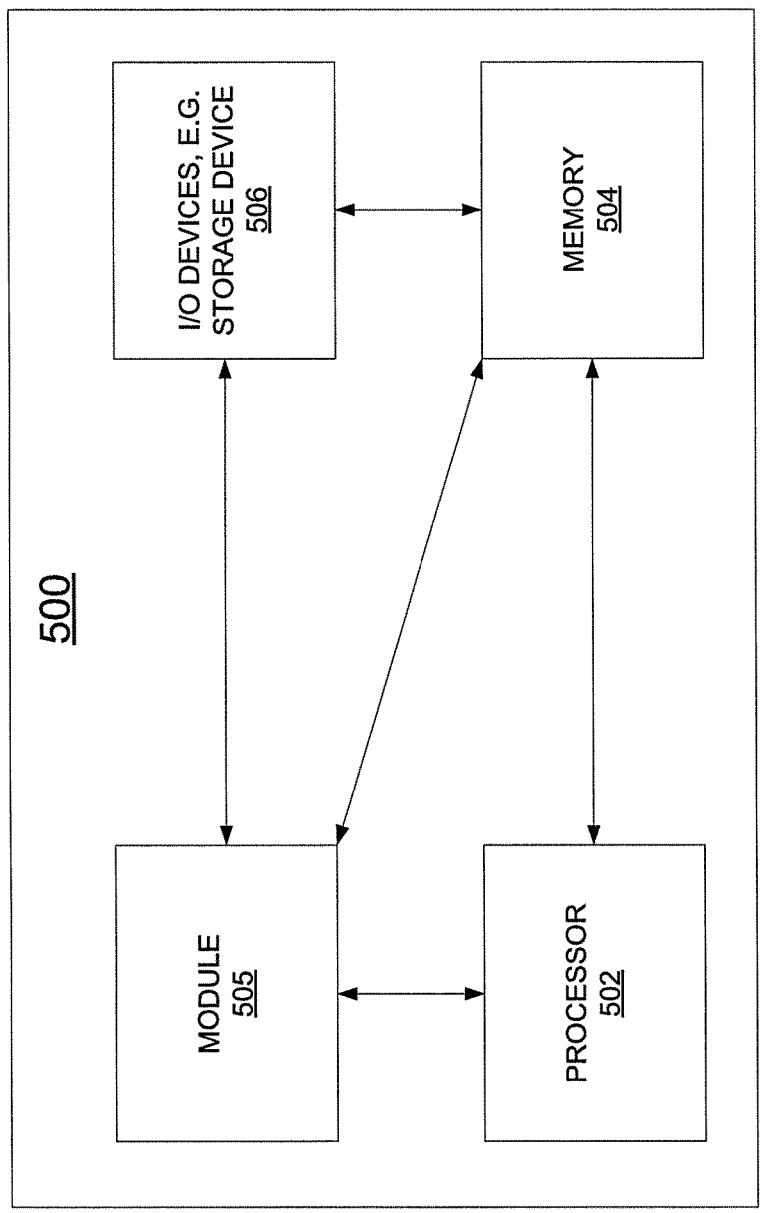
FIG. 5 illustrates a high level block diagram of a general purpose computer suitable for use in performing the functions described herein.

FIG. 5 depicts a high level block diagram of a general purpose computer suitable for use in performing the functions described herein. For examples, any one or more components or devices illustrated in FIGS. 1 and 2 or described in connection with the methods 300 or 400 may be implemented as the system 500. As depicted in FIG. 5, the system 500 comprises a hardware processor element 502 (e.g., a microprocessor, a central processing unit (CPU) and the like), a memory 504, e.g., random access memory (RAM) and/or read only memory (ROM), a module 505 for synchronizing a mobile device to a display, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that embodiments of the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed methods. In one embodiment, the present module or process 505 for synchronizing a mobile device to a display can be implemented as computer-executable instructions (e.g., a software program comprising computer-executable instructions) and loaded into memory 504 and executed by hardware processor 502 to implement the functions as discussed above. As such, the present module or process 505 for synchronizing a mobile device to a display as discussed above in method 300 or method 400 respectively (including associated data structures) can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:

obtaining, by a processor, an identification code for a display; and presenting, by the processor, the identification code on the display, wherein the identification code comprises an image presented on the display at a rate where the image is not detectable to a human eye, wherein the image is presented in its entirety in each and every frame of a plurality of frames, the image being superimposed over one or more existing images displayed in the plurality of frames, wherein the image represents an internet protocol address and at least one extension that is assigned by an operator of the display, wherein the at least one extension comprises at least a time stamp, wherein the image is for establishing a communication session between a mobile device and the display.

2. The method of claim 1, wherein a frame rate of the display is greater than 24 frames per second.

3. The method of claim 1, wherein the image comprises a quick response code.

4. The method of claim 1, wherein the identification code is to be received by the mobile device via an optical sensor of the mobile device.

5. The method of claim 1, wherein the establishing the communication session comprises interworking a different display formatting of the mobile device and a display formatting of the display.

6. The method of claim 1, wherein the communication session is established when the mobile device is successfully authenticated.

7. The method of claim 1, wherein the communication session is established when the display is determined to be available for the communication session.

8. A display, comprising:
   a processor; and
   a computer-readable medium storing a plurality of instructions which, when executed by the processor, cause the processor to perform operations, the operations comprising:
      obtaining an identification code for a display; and
      presenting the identification code on the display, wherein the identification code comprises an image presented on the display at a rate where the image is not detectable to a human eye, wherein the image is presented in its entirety in each and every frame of a plurality of frames, the image being superimposed over one or more existing images displayed in the plurality of frames, wherein the image represents an Internet protocol address and at least one extension that is assigned by an operator of the display, wherein the at least one extension comprises at least a time stamp, wherein the image is for establishing a communication session between a mobile device and the display.

9. The display of claim 8, wherein a frame rate of the display is greater than 24 frames per second.

10. The display of claim 8, wherein the image comprises a quick response code.

11. The display of claim 8, wherein the identification code is to be received by the mobile device via an optical sensor of the mobile device.

12. The display of claim 8, wherein the establishing the communication session comprises interworking a different display formatting of the mobile device and a display formatting of the display.

13. The display of claim 8, wherein the communication session is established when the mobile device is successfully authenticated.

14. The display of claim 8, wherein the communication session is established when the display is determined to be available for the communication session.

15. A tangible computer-readable medium storing a plurality of instructions which, when executed by a processor, cause the processor to perform operations, the operations comprising:
   obtaining an identification code for a display; and
   presenting the identification code on the display, wherein the identification code comprises an image presented on the display at a rate where the image is not detectable to a human eye, wherein the image is presented in its entirety in each and every frame of a plurality of frames, the image being superimposed over one or more existing images displayed in the plurality of frames, wherein the image represents an Internet protocol address and at least one extension that is assigned by an operator of the display, wherein the at least one extension comprises at least a time stamp, wherein the image is for establishing a communication session between a mobile device and the display.

16. The tangible computer-readable medium of claim 15, wherein a frame rate of the display is greater than 24 frames per second.

17. The tangible computer-readable medium of claim 15, wherein the image comprises a quick response code.

18. The tangible computer-readable medium of claim 15, wherein the identification code is to be received by the mobile device via an optical sensor of the mobile device.

19. The tangible computer-readable medium of claim 15, wherein the establishing the communication session comprises interworking a different display formatting of the mobile device and a display formatting of the display.

20. The tangible computer-readable medium of claim 15, wherein the communication session is established when the mobile device is successfully authenticated.

* * * * *